(12) United States Patent
Gahleitner et al.

(10) Patent No.: US 8,759,452 B2
(45) Date of Patent: *Jun. 24, 2014

(54) PROPYLENE COMPOSITION WITH HIGH STIFFNESS AND IMPACT STRENGTH

(75) Inventors: Markus Gahleitner, Neuhofen a.d. Krems (AT); Bo Malm, Espoo (FI); Klaus Bernreitner, Linz (AT); Juliane Braun, Linz (AT)

(73) Assignee: Borealis AG, Vienna ( * ) Notice: Subject to any disclaimer, the term of this patent is extended or adjusted under 35 U.S.C. 154(b) by 10 days.

This patent is subject to a terminal disclaimer.

(21) Appl. No.: 13/129,511

(22) PCT Filed: Feb. 4, 2010

(86) PCT No.: PCT/EP2010/000701
§ 371 (c)(1),
(2), (4) Date: May 16, 2011

(87) PCT Pub. No.: WO2010/089121
PCT Pub. Date: Aug. 12, 2010

(65) Prior Publication Data
US 2011/0229670 A1    Sep. 22, 2011

(30) Foreign Application Priority Data
Feb. 4, 2009  (EP) .................................... 09001548

(51) Int. Cl.
*C08J 3/22* (2006.01)
*C08F 290/14* (2006.01)
*C08L 23/00* (2006.01)
*C08F 110/02* (2006.01)

(52) U.S. Cl.
USPC ........... 525/240; 525/242; 525/245; 525/322; 526/351; 524/451

(58) Field of Classification Search
None
See application file for complete search history.

(56) References Cited

U.S. PATENT DOCUMENTS

| 5,141,994 | A | 8/1992 | Kakugo et al. |
| 5,473,016 | A | 12/1995 | Fujii |
| 8,557,917 | B2 * | 10/2013 | Leskinen et al. ................. 525/53 |
| 2008/0214704 | A1 * | 9/2008 | Harjuntausta et al. .......... 524/58 |
| 2011/0160373 | A1 * | 6/2011 | Bernreitner et al. .......... 524/451 |

FOREIGN PATENT DOCUMENTS

| EP | 0953597 | 11/1999 |
| EP | 1183307 | 3/2006 |
| KR | 648644 | * 11/2006 |
| WO | 00/26295 | 5/2000 |
| WO | 00/27911 | 5/2000 |
| WO | 2006074887 | 7/2006 |
| WO | 2006114358 A2 | 11/2006 |
| WO | 2006122702 | 11/2006 |
| WO | 2008006586 | 1/2008 |
| WO | 03097731 | 5/2011 |

OTHER PUBLICATIONS

Written Opinion of the International Searching Authority for PCT/EP2010/000701.
International Search Report for PCT/EP2010/000701.
International Preliminary Report on Patentability for PCT/EP2010/000701, dated Nov. 26, 2010.

* cited by examiner

*Primary Examiner* — Jennifer Chriss
*Assistant Examiner* — Camie Thompson
(74) *Attorney, Agent, or Firm* — Milbank, Tweed, Hadley & McCloy LLP

(57) ABSTRACT

The present invention is directed to a polypropylene composition comprising
  a propylene homo- or copolymer (A) with a polydispersity index (PI), determined according ISO 6721-1, of at least 5.8 Pa$^{-1}$; and an inorganic filler (B) in an amount from 2.0 to 20 parts per weight based on 100 parts per weight of (A)+(B);

Figure 1A:
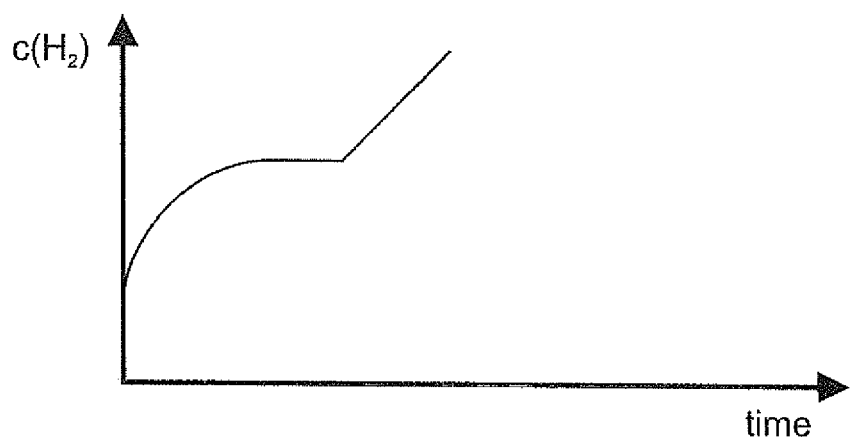
Figure 1B:
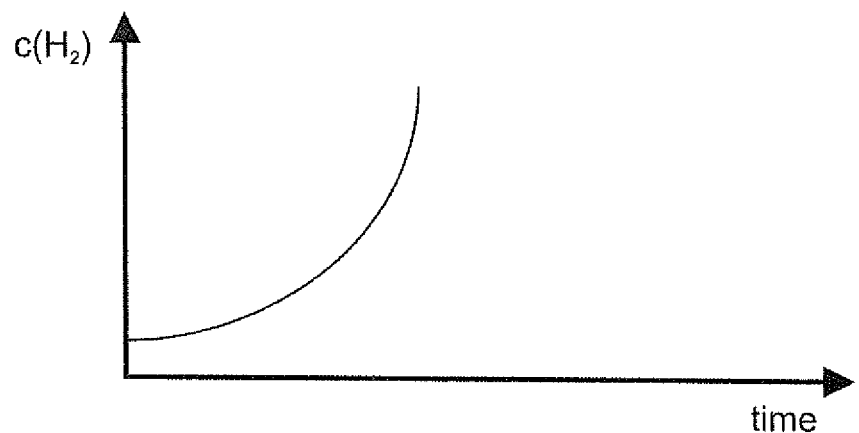
Figure 1C:
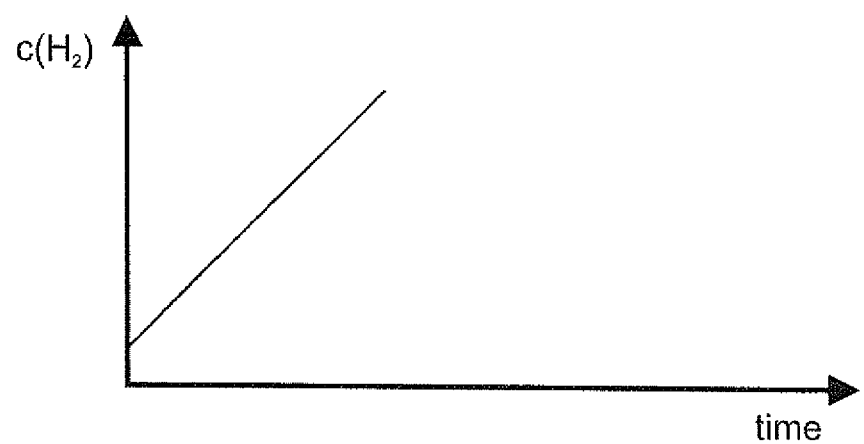
Figure 1D:
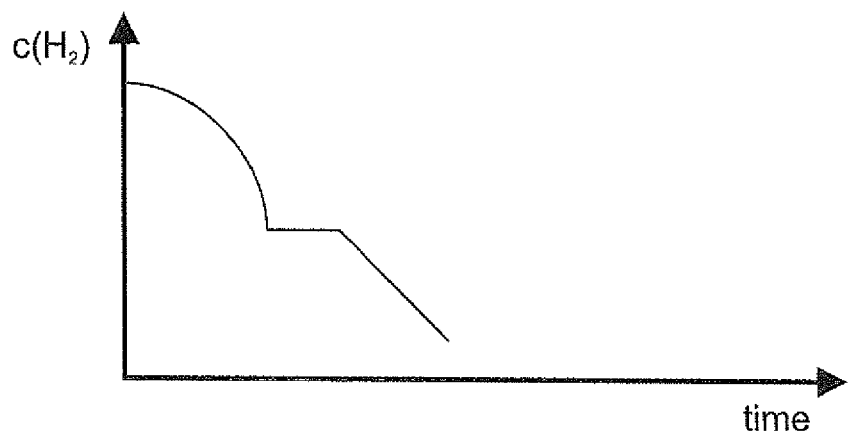
Figure 1E:
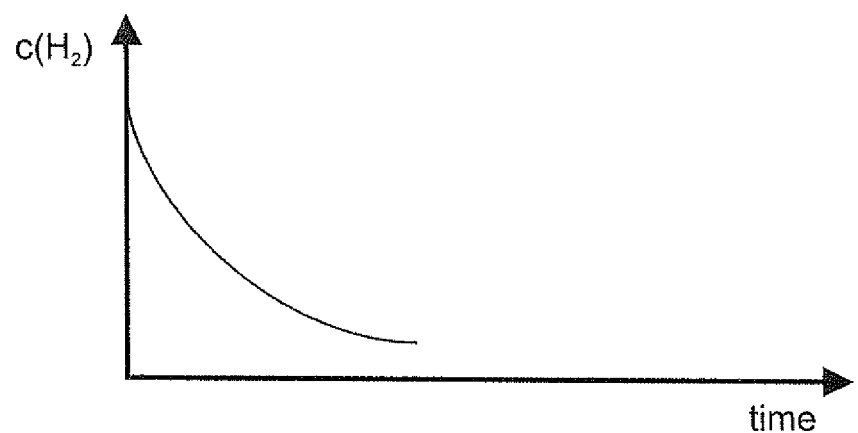
Figure 1F:
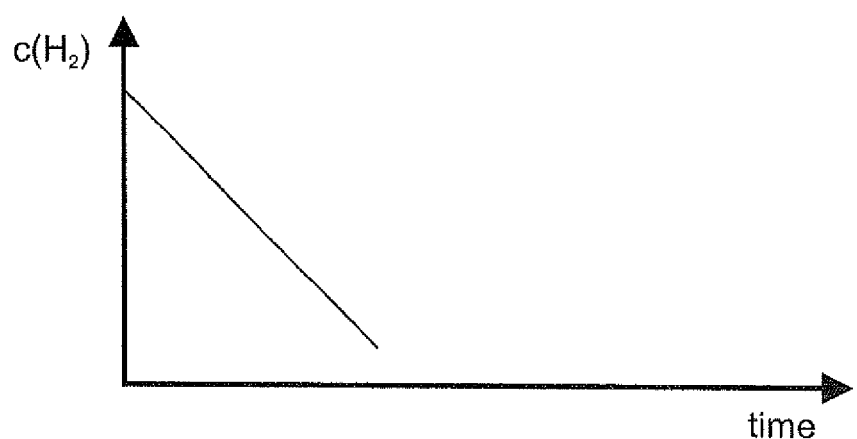

The present invention is furthermore directed to a polypropylene composition comprising a propylene homo- or copolymer (A); and an inorganic filler (B);

whereby the following relation is fulfilled $$(80F+1700)\text{MPa} \leq T$$

wherein

F are the parts per weight of component (B) based on 100 parts per weight of the total amount of (A)+(B).

T is the tensile modulus in MPa, determined according to ISO 527-2, of the polypropylene composition measured on a test specimen prepared by injection molding according to ISO 1873-2.

The present invention is also directed to a process for the production of the polypropylene compositions according to the invention and to an article made of the polypropylene compositions according to the invention.

The present invention is furthermore directed to the use of the polypropylene compositions according to the invention for the production of pipes, car components, appliance housings, transport containers.

10 Claims, 5 Drawing Sheets

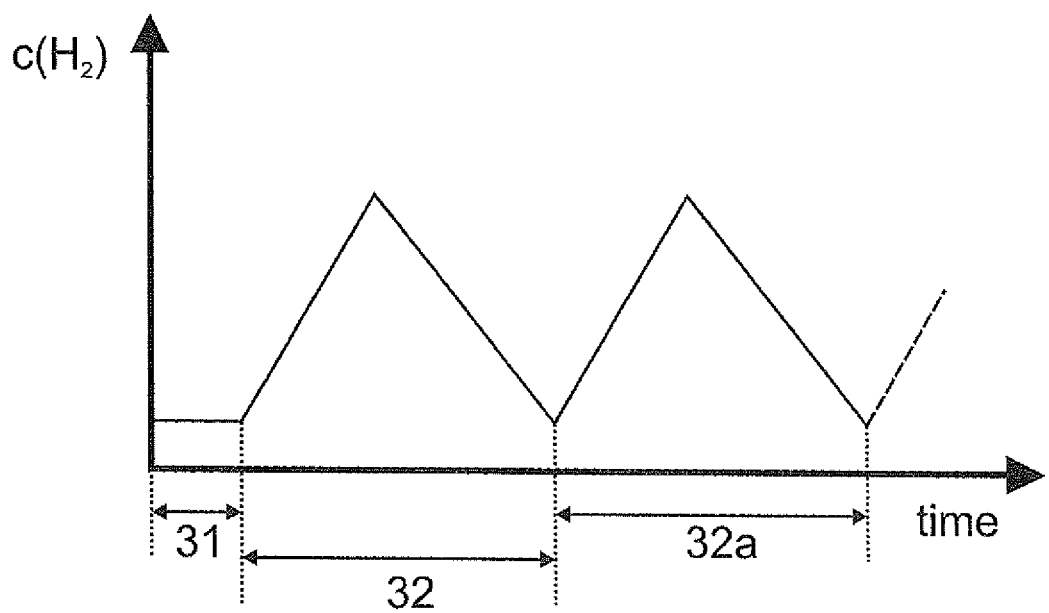

PROPYLENE COMPOSITION WITH HIGH STIFFNESS AND IMPACT STRENGTH

This application is based on International Application PCT/EP2010/000701 filed Feb. 4, 2010, which claims priority to European Patent Application No. 09001548.8, filed on Feb. 4, 2009, the disclosures of which are herein incorporated by reference in their entireties.

The present application relates to a polypropylene composition having a very high stiffness in combination with a good impact strength, to a method for the production thereof and an article, especially pipes, car components, appliance housing and transport containers made thereof.

Various attempts have been made to improve the stiffness of polypropylenes, by high filler contents and by combining fillers with special nucleation, usually beta-nucleation. However, high amount of fillers have several disadvantages like reduction of the toughness, an increased embrittlement, a higher scratch sensitivity and a larger amount of surface defects, a reduction of the processability and—depending on the filler—smell and taste problems.

Beta-nucleation of polypropylene generally results in a lower stiffness compared with alpha-nucleated polypropylene at somewhat better impact properties. To improve the stiffness of beta-nucleated polypropylenes high amounts of filler, typically above 50 wt. %, are usually added.

WO 03/097731 describes a beta-nucleated polypropylene with a content of talc of up to 70%. Although the compositions described therein have an acceptable impact strength in a charpy notched test, the stiffness of the compositions is considerably low. The beta-nucleation also reduces the thermal resistance of the compositions. The melting points of the compositions is rather low.

U.S. Pat. No. 5,141,994 describes a crystalline polypropylene with an acceptable impact strength but a relatively low stiffness.

EP 1 183 307 describes a process for the production of a crystalline polypropylene. The problem of impact resistance is only addressed for heterophasic propylene copolymers.

WO 2006/074887 is directed to nanocomposites with improved flame retardancy, improved mechanical properties and improved barrier properties.

EP 0 953 597 relates to the heat stabilization of graft copolymers of propylene polymer materials.

WO 2006/122702 discloses a polypropylene-based composition which can be processed at lower melt temperature and/or melt pressure but still results in a material of high stiffness and excellent surface properties.

U.S. Pat. No. 5,473,016 discloses a polyolefin-based matter film or sheet prepared from a polymeric blend.

Considering the above-mentioned disadvantages, the object of the present invention is to provide a polypropylene composition having high impact strength and high stiffness. Furthermore, the polymer should have good surface quality and good scratch resistance.

Therefore, the present invention provides in a first embodiment a polypropylene composition comprising
  a propylene homo- or copolymer (A) with a polydispersity index (PI), determined according ISO 6721-1, of at least 5.8 $Pa^{-1}$; and
  an inorganic filler (B) in an amount from 2.0 to 20 parts per weight based on 100 parts per weight of (A)+(B).

The invention further provides in a second embodiment a polypropylene composition comprising
  a propylene homo- or copolymer (A); and
  an inorganic filler (B);
  whereby the following relation is fulfilled
    $(80F+1700) MPa \leq T$
  wherein
  F are the parts per weight of component (B) based on 100 parts per weight of (A)+(B).
  T is the tensile modulus in MPa, determined according to ISO 527-2, of the polypropylene composition measured on a test specimen prepared by injection molding according to ISO 1873-2.

For example an F value of 5 denotes an amount of 5 parts per weight of component (B) based on 100 parts per weight of (A)+(B).

It has been surprisingly found that the inventive polypropylene compositions according to the first and second embodiment yield high impact strength and high stiffness. Furthermore, the inventive compositions yield articles having a good surface quality and good scratch resistance resulting from the low amount of filler.

The molecular weight distribution is frequently determined as $M_w/M_n$ by gel permeation chromatography (GPC), which is a solvent technique measuring the percentage or distribution of molecules having different molecular weight. The method is usually carried out according to ISO16014-1: 2003. $M_w$ is the weight average molecular weight and $M_n$ is the number average molecular weight. In the literature the terms "the molecular weight distribution", "(MWD)", "polydispersity" and "polydispersity index" are prevalently used synonymously to denote the ratio $M_w/M_n$ which is scientifically not correct.

The use of GPC analysis finds its limitation when ultra high molecular weight material is concerned. GPC as a solution technique requires that the polymer chains are sufficiently soluble and sufficiently stable in solution. Polymers having a molecular weight of >2,000,000 g/mol are generally completely insoluble. Furthermore, even if soluble polymer chains with a molecular weight of above 1,000,000 g/mol tend to break when dissolved for the GPC measurement or during the measurement leading to an incorrect result. Thus, the GPC method is not easily applicable to polymers comprising a significant amount of a fraction having an M, of above 1,000,000 g/mol.

Apart from GPC measurement, the broadness of the molecular weight distribution the broadness of the molecular weight distribution can also be determined by melt rheological measurement according ISO 6721-1. The values obtained by said measurement are given in $Pa^{-1}$. This value is also referred to as polydispersity index (PI) in the literature, e.g. in WO 2008/006586.

All expressions containing letters from the Greek alphabet are repeated in squared brackets in case errors occur when reprinted.

The values of storage modulus (G'), loss modulus (G"), complex modulus (G*) and complex viscosity (η*) [(eta*)] are obtained as a function of frequency (ω) [(omega)] as described in the experimental part. The polydispersity index, $$PI=10^5/G_c,$$

is calculated from cross-over point of G'(ω) [G'(omega)] and G"(ω) [G"(omega)] at 230° C., for which $$G'(\omega_c)=G''(\omega_c)=G_c[G'(omega_c)=G''(omega_c)=G_c]$$

holds.

A distinction between the polydispersity index (PI), measured according ISO 6721-1 and $M_w/M_n$ is without any ambiguity because $M_w/M_n$ is a dimensionless quantity whereas the PI determined according to ISO 6721-1 is reported in $Pa^{-1}$. In the present invention the term "polydispersity index" or "PI" denote the value obtained according ISO 6721-1.

Owing to the high broadness of the molecular weight distribution of the propylene homo- or copolymer (A) used in the present invention, the polydispersity index according to ISO 6721-1 has been used to determine the molecular weight distribution.

Further, due to the high polydispersity of the propylene homo- or copolymer (A) it was also not possible to determine the weight average molecular weight ($M_w$) in the usual manner by GPC measurement. Instead the weight average molecular weight was calculated from the zero shear viscosity ($\eta_0$) [(eta$_0$)] as resulting from a Cox-Merz conversion of the complex viscosity. Said calculation was carried out with using a calibration curve established in Grein et al., *Rheol Acta*, (2007), 1083-1089. Unless otherwise mentioned the values given in the following for the $M_w$ have been determined as described in this paragraph.

The tensile modulus is a property of the propylene homo- or copolymer. Therefore, the test specimen does not comprise any nucleating agent. The exact determination method is described in the experimental part.

The term "polypropylene" denotes a propylene homo- or copolymer or a mixture of propylene homo- or copolymers.

The polypropylene composition according to the invention can be formed into articles of various shapes through known techniques, such as injection molding, extrusion, blow molding, compression molding, thermoforming, fiber spinning, foaming, film casting and/or blowing etc.

Preferably, in the polypropylene composition according to the first embodiment the following relation is fulfilled (80$F$+1700)MPa≤$T$ wherein
F are the parts per weight of component (B) based on 100 parts per weight of (A)+(B).
T is the tensile modulus in MPa, determined according to ISO 527-2, of the polypropylene composition measured on a test specimen prepared by injection molding according to ISO 1873-2.

In the second embodiment the propylene homo- or copolymer (A) preferably has a polydispersity index (PI), determined according ISO 6721-1, of at least 5.8 Pa$^{-1}$.

Preferably, in the second embodiment the inorganic filler (B) is present in an amount from 2.0 to 20 parts per weight based on 100 parts per weight of (A)+(B).

In the following preferred features of the first and the second embodiment according to the present invention are described.

Preferably, component (A) has a polydispersity index of at least 6.0 Pa$^{-1}$, more preferably of at least 7.0 Pa$^{-1}$, even more preferably of at least 7.5 Pa$^{-1}$, even more preferably of at least 8.0 Pa$^{-1}$ and most preferably of at least 8.5 Pa$^{-1}$. Said PI will usually not be higher than 15.0 Pa$^{-1}$.

Preferably, component (A) obtained from the reactor has an MFR$_2$, measured according to ISO 1133 at 230° C. and under a load of 2.16 kg, of at least 0.01 g/10 min, more preferably of at least 0.1 g/10 min, even more preferably of at least 1.0 g/10 min, even more preferably of at least 2.0 g/10 min even more preferably of at least 3.5 g/10 min.

Further, preferably, component (A) obtained from the reactor has an MFR$_2$, measured according to ISO 1133 at 230° C. and under a load of 2.16 kg, of not more than 50 g/10 min, more preferably of not more than 25 g/10 min, even more preferably of not more than 10 g/10 min.

Preferably, component (A) has an MFR$_2$ after pelletising, measured according to ISO 1133 at 230° C. and under a load of 2.16 kg, of at least 0.10 g/10 min, more preferably of at least 0.05 g/10 min, even more preferably of at least 0.1 g/10 min and most preferably of at least 1.0 g/10 min.

Further, preferably, component (A) has an MFR$_2$ after pelletising, measured according to ISO 1133 at 230° C. and under a load of 2.16 kg, of not more than 100 g/10 min, more preferably of not more than 50 g/10 min, even more preferably of not more than 25 g/10 min, even more preferably of not more than 10 g/10 min and most preferably of not more than 5.0 g/10 min.

Preferably, the propylene homo- or copolymer (A) has a tensile modulus, determined according to ISO 527-2, of at least 1600 MPa, more preferably of at least 1675 MPa, even more preferably of at least 1750 MPa and most preferably of at least 1800 MPa measured on a test specimen prepared by injection molding according to ISO 1873-2. Usually said tensile modulus does not exceed 3500 MPa.

Preferably, the propylene homo- or copolymer (A) has a tensile stress at yield, determined according to ISO 527-2, of at least 35.0 MPa, more preferably of at least 37.0 MPa measured on a test specimen prepared by injection molding according to ISO 1873-2. Usually said tensile stress at yield will not be higher than 70.0 MPa.

Preferably, the propylene homo- or copolymer (A) has a tensile strain at yield, determined according to ISO 527-2, of not more than 10.0%, more preferably of not more than 9.0% and most preferably of not more than 8.5% measured on test specimen prepared by injection molding according to ISO 1873-2.

Preferably, the propylene homo- or copolymer (A) has an impact strength in a charpy notch test according to ISO 179/1eA:2000 at +23° C. of at least 3.0 kJ/m$^2$, more preferably of at least 3.5 kJ/m$^2$ and most preferably of at least 4.0 kJ/m$^2$ measured on a V-notched test specimen prepared by injection molding according to ISO 1873-2. Said impact strength will usually not be higher than 50.0 kJ/m$^2$.

Preferably, component (A) has a weight average molecular weight ($M_w$) of at least 400,000 g/mol, more preferably of at least 450,000 g/mol, even more preferably of at least 500,000 g/mol and most preferably of at least 550,000 g/mol. For processability reasons said $M_W$ does usually not exceed 1,500,000 g/mol.

Preferably, the terminal relaxation time $\lambda_T$ [lambda$_T$] of the propylene homo- or copolymer (A) calculated at a relaxation strength H($\lambda$) [H(lambda)] of 0.1 Pa is at least 1000 s, more preferably at least 2500 s, even more preferably at least 4000 s. Usually said terminal relaxation time $\lambda_T$ [lambda$_T$] is calculated at a relaxation strength H($\lambda$) [H(lambda)] of 0.1 Pa will not be higher than 50,000 s.

Preferably, the propylene homo- or copolymer (A) has a pentade concentration of more than 90%, more preferably of more than 95% and most preferably of more than 97%.

Preferably, the amount of component (A) is at least 70 wt. %, more preferably is at least 80 wt. % and most preferably is at least 85 wt. % of the polypropylene composition.

Further, preferably, the amount of component (A) is not more than 97.5 wt. %, more preferably is not more than 95.0 wt. % and most preferably is not more than 90 wt. % of the polypropylene composition.

Preferably, component (A) is a propylene homopolymer or a propylene block copolymer comprising a propylene homopolymer and a propylene/alpha-olefin rubber. In case component (A) comprises a propylene/alpha-olefin rubber, the comonomers used for the production of the propylene/alpha-olefin rubber may be selected from any copolymerisable alpha-olefins. However, ethylene and/or $C_4$- to $C_{20}$-alpha-olefins are preferred, even more preferred are ethylene and/or $C_4$- to $C_{15}$-alpha-olefins, even more preferred are ethylene and/or $C_4$- to $C_{10}$-alpha-olefins, e.g. ethylene, 1-butene, 1-hexene, 1-octene, and most preferably the alpha-olefin is ethylene.

More preferably component (A) is a propylene homopolymer.

Preferably, component (B) is selected from the group of inorganic modifiers having a highly anisotropic particulate structure, being anisotropic in a one-dimensional (fiber-like) or two-dimensional (platelet-like) fashion. Preferred examples include natural silicates, glass platelets and/or fibers, more preferably inosilicates (e.g. wollastonite), phyllosilicates (e.g. clay minerals and mica) and/or glass platelets, even more preferably phyllosilicates or wollastonite, even more preferably clay minerals (e.g. talc, montmorillonite, hectorite, vermiculite, bentonite), mica or wollastonite. Among these, talc, mica and wollastonite are especially preferred whereof talc is especially preferred.

Preferably, the amount of inorganic filler (B) is at least 4.0, more preferably is at least 6.0 and most preferably at least 8.0 parts per weight based on 100 parts per weight of (A)+(B).

Further, preferably, the amount of inorganic filler (B) is not more than 18.0, more preferably not more than 16.0 and most preferably not more than 14.0 parts per weight based on 100 parts per weight of (A)+(B).

Preferably, before compounding, component (B) has a particle size d95 of 50 micrometer or less, preferably 25 micrometer or less and most preferably 15 micrometer or less measured by laser diffraction according to ISO 13320-1:1999.

Preferably, the particle size d95 before compounding of component (B) preferably is not less than 1 micrometer, more preferably not less than 2 micrometers measured by laser diffraction according to ISO 13320-1:1999.

Preferably, component (B) has a specific surface (BET) before compounding of at least 5.0 $m^2/g$, more preferably of at least 7.0 $m^2/g$ and most preferably at least 9.0 $m^2/g$, determined according to DIN 66131/2. Said surface area will usually not be higher than 100.0 $m^2/g$.

Preferably, component (B) has an average aspect ratio before compounding, defined as the ratio between the biggest and the smallest average dimensions of the reinforcing agents before compounding the polypropylene composition, of at least 5.0, even more preferably of at least 7.5 and most preferably of at least 10.0. Usually the average aspect ratio will not be higher than 50.0.

Preferably, the polypropylene composition has an $MFR_2$ measured according to ISO 1133 at 230° C. and under a load of 2.16 kg of at least 0.01 g/10 min, more preferably of at least 0.05 g/10 min and most preferably of at least 0.1 g/10 min.

Further, preferably the polypropylene composition has an $MFR_2$ measured according to ISO 1133 at 230° C. and under a load of 2.16 kg of not more than 100 g/10 min, more preferably of not more than 50 g/10 min and most preferably of not more than 20 g/10 min.

Further, preferably, the polypropylene composition has a melting temperature $T_m$ determined according to ISO 3146-3/C2 of at least 155° C., more preferably of at least 160° C. and most preferably of at least 165° C. measured on a test specimen prepared by injection molding according to ISO 1873-2. Said melting temperature will usually not be higher than 250° C.

Preferably, the polypropylene composition has a heat of fusion determined according to ISO 3146-3/C2 of at least 80 J/g, more preferably of at least 90 J/g and most preferably of at least 95 J/g measured on a test specimen prepared by injection molding according to ISO 1873-2. Usually said heat of fusion will not be more than 120 J/g.

The polypropylene composition preferably has a crystallization temperature $T_c$ determined according to ISO 3146-3/C2 of at least 120° C., more preferably of at least 125° C. measured on a test specimen prepared by injection molding according to ISO 1873-2. Usually $T_c$ will not be higher than 130° C.

The polypropylene composition preferably has a heat of crystallization determined according to ISO 3146-3/C2 of at least 75 J/g, more preferably of at least 85 J/g and most preferably of at least 90 J/g measured on a test specimen prepared by injection molding according to ISO 1873-2. Usually said heat of crystallization will not be higher than 110 J/g.

Further, preferably, the polypropylene composition has a tensile modulus determined according to ISO 527-2 of at least 2000 MPa, more preferably of at least 2200 MPa and most preferably of at least 2300 MPa measured on a test specimen prepared by injection molding according to ISO 1873-2.

Further, preferably, in the polypropylene composition the following relation is fulfilled $$(80F+1800) \text{MPa} \leq T$$

wherein
F are the parts per weight of component (B) based on 100 parts per weight of (A)+(B),
T is the tensile modulus in MPa, determined according to ISO 527-2, of the polypropylene composition measured on a test specimen prepared by injection molding according to ISO 1873-2.

Most preferably, in the polypropylene composition the following relation is fulfilled $$(80F+1900) \text{MPa} \leq T$$

with F and T being the same as defined above.

Said tensile modulus will usually not be higher than 7,000 MPa.

The polypropylene composition preferably has a tensile stress at yield, determined according to ISO 527-2, of at least 38.0 MPa, more preferably of at least 39.0 MPa measured on a test specimen prepared by injection molding according to ISO 1873-2. Usually said tensile stress at yield will not be higher than 90.0 MPa.

Preferably, the polypropylene composition has an impact strength in a charpy notch test according to ISO 179/1eA: 2000 at +23° C. of at least 3.8 $kJ/m^2$, more preferably of at least 4.0 $kJ/m^2$ measured on a V-notched test specimen prepared by injection molding according to ISO 1873-2. Said impact strength will usually not be higher than 20.0 $kJ/m^2$.

Further, preferably, the polypropylene composition has a heat deflection temperature determined according to ISO 75A at 1.8 MPa of at least 55° C., more preferably of at least 58° C. measured on a test specimen having the dimension of 80×10×4 $mm^3$ and prepared by injection molding according to ISO 1873-2. Usually said heat deflection temperature will not be higher than 120° C.

The specimen used for the determination of the longitudinal and transversal shrinkage of the polypropylene composition has a dimension of 150×80×2 $mm^3$ and has been prepared by injection molding as described in the experimental part. Longitudinal and transversal shrinkage are both measured on the 150×80 $mm^2$ side of the specimen. Longitudinal shrinkage denotes the shrinkage in the direction of the polymer flow during injection molding. Transversal shrinkage denotes the shrinkage in the direction perpendicular to the flow direction.

Preferably, the polypropylene composition has a longitudinal shrinkage of not more than 2.2%, more preferably of not more than 1.8% and most preferably of not more than 1.5%.

Further, preferably the polypropylene composition has a transversal shrinkage of not more than 2.0%, more preferably of not more than 1.6% and most preferably of not more than 1.3%.

Moreover, the polypropylene composition of the invention may further contain various additives, such as miscible thermoplastics, antioxidants, UV-stabilizers, lubricants, demoulding agents, nucleating agents, fillers, colouring agents, and foaming agents which can be added to the composition before, during or after the blending in an amount of up to 5.0 wt %, preferably up to 3.0 wt % based on the total polypropylene composition.

Preferably, the propylene homo- or copolymer (A) is produced in the presence of a Ziegler-Natta catalyst, more preferably in the presence of a Ziegler-Natta catalyst capable of catalyzing the polymerization of propylene at a pressure from 10 to 100 bar, preferably from 25 to 80 bar, and at a temperature from 40 to 120° C., preferably from 60 to 100° C.

The Ziegler-Natty catalyst used in the present invention preferably comprises a catalyst component, a cocatalyst component, an external donor, the catalyst component of the catalyst system primarily containing magnesium, titanium, halogen and an internal donor. Electron donors control the stereo-specific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds. The titanium compound usually is a halide or oxyhalide, an organic metal halide, or a purely metal organic compound in which only organic ligands have been attached to the transition metal. Particularly preferred are the titanium halides, especially titanium tetrachloride, titanium trichloride and titanium tetrachloride being particularly preferred.

Magnesium dichloride can be used as such or it can be combined with silica, e.g. by absorbing the silica with a solution or slurry containing magnesium dichloride. A lower alcohol can be used which preferably is methanol or ethanol and most preferably ethanol.

A preferred type of catalyst to be used in the present invention is disclosed in EP 591 224 which discloses a method for preparing a pro-catalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups from the lower alcohol and the phthalic ester change places.

The alkoxy group of the phthalic acid ester used comprises at least five carbon atoms, preferably at least eight carbon atoms. Thus, as the ester may be used propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the pro-catalyst composition, transesterifies the catalyst at an elevated temperature. It is preferred to carry out the transesterification at a temperature which is at least 110° C., preferably is at least 120° C. and which preferably does not exceed 140° C. more preferably does not exceed 115° C.

The catalyst is used together with an organometallic cocatalyst and with an external donor. Generally, the external donor has the formula

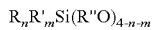

wherein
R and R' can be the same or different and represent a linear, branched or cyclic aliphatic, or aromatic group;
R" is methyl or ethyl;
n is an integer of 0 to 3;
m is an integer of 0 to 3; and
n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

Any cocatalyst known in the art may be used in the present invention, preferably, an organoaluminium compound is used as the cocatalyst. The organoaluminium compound is preferably selected from the group consisting of trialkyl aluminium, dialkyl aluminium chloride and alkyl aluminium sesquichloride.

Such catalysts are preferably introduced into the first reactor only. The components of the catalyst can be fed into the reactor separately or simultaneously or the components of the catalyst system can be precontacted prior to the reactor.

Such pre-contacting can also include a catalyst pre-polymerization prior to feeding into the polymerization reactor. In the pre-polymerization, the catalyst components are contacted for a short period with a monomer before feeding to the reactor.

The propylene homo- or copolymer (A) can have a unimodal or multimodal, like bimodal, molar mass distribution (MWD). Thus, the equipment of the polymerization process can comprise any polymerization reactors of conventional design for producing propylene homo- or copolymers (A). For the purpose of the present invention "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises (is) a bulk loop reactor. By "gas phase reactor" is meant any mechanically mixed or fluid bed reactor. Preferably the gas phase reactor comprises a mechanically agitated fluid bed reactor with gas velocities of at least 0.2 m/sec.

Thus, the polymerization reactor system can comprise one or more conventional stirred tank slurry reactors, as described in WO 94/26794, and/or one or more gas phase reactors.

Preferably the reactors used are selected from the group of loop and gas phase reactors and, in particular, the process employs at least one loop reactor and at least one gas phase reactor. This alternative is particularly suitable for producing the propylene homo- or copolymer (A) with a broad molecular weight distribution (MWD) according to this invention. By carrying out the polymerization in the different polymerization reactors in the presence of different amounts of hydrogen the MWD of the product can be broadened and its mechanical properties improved. It is also possible to use several reactors of each type, e.g. one loop reactor and two or three gas phase reactors or two loop reactors and one gas phase reactor, in series.

More preferably component (A) is prepared by the process described in the following:

A process for the production of polyolefins in one or more reactors, wherein in at least one reactor the process comprises the following steps
  (c) feeding one or more (co)monomers and hydrogen to the reactor, whereby the hydrogen concentration in said reactor is periodically varied;
  (d) preparing an olefin homo- or copolymer in the presence of an olefin polymerization catalyst;
  (e) withdrawing the olefin homo- or copolymer from said at least one reactor
whereby
the following relation is fulfilled $$\frac{P}{\tau} > 2.0$$

wherein
  P is the time of one variation period of the hydrogen concentration in said at least one reactor; and
  $\tau$ [tau] is the average residence time of the polymer in said at least one reactor.

The average residence time $\tau$ [tau] in a reactor is defined as the ratio of the reaction volume of the reactor $V_R$ to the volumetric outflow rate from the reactor $Q_0$ i.e. $\tau = V_R/Q_0$ [tau=$V_R/Q_0$].

In case of a loop reactor or a liquid-filled continous stirred tank reactor (CSTR), $V_R$ equals to the reactor volume; in case of a normal CSTR, it equals to the volume of the slurry within the reactor.

A variation period is the period of time in which the value of the initial hydrogen concentration in the reactor is reached again under the proviso that there is an enduring change. For example, if the initial hydrogen concentration is 80 ppm and is increased up to 5000 ppm and again lowered, the variation period will denote the period of time until the hydrogen concentration in the reactor is 80 ppm again.

The process allows to significantly broaden the MWD (Mw/Mn) and the polydispersity index (PI) (up to 200%) compared with a polymer produced in a single reactor without periodically varying the hydrogen concentration in said reactor whereby the process is applicable to reactors of any size and to several types of reactors, e.g. a stirred tank or loop reactor in the liquid phase, but it can also be carried out in a gas phase reactor, like a fluidized bed reactor or stirred bed reactor.

For this invention a periodically varying function shall consist of one or more period(s) of the same length.

In a periodically varying function the condition $f(x+a)=f(x)$ is met for all values of x whereby a is the length of one variation period.

As this invention is concerned with various time dependent kinetics the following definitions shall apply.

In the present application "monotonically increasing function" denotes a function wherein $f(x_2) \geq f(x_1)$ when $x_2 > x_1$.

In the present application "strictly monotonic increasing function" denotes a function wherein $f(x_2) > f(x_1)$ when $x_2 > x_1$.

In the present application "monotonically decreasing function" denotes a function wherein $f(x_2) \leq (x_1)$ when $x_2 > x_1$.

In the present application "strictly monotonic decreasing function" denotes a function wherein $f(x_2) < f(x_1)$ when $x_2 > x_1$.

The variation of the hydrogen concentration of the reactor may be carried out in the from of a sinusoidal function, a non-sinusoidal rectangular, a saw-tooth function, a triangle function, one or more pulse functions, one or more step functions or any combination thereof.

The term "hydrogen concentration in at least one said reactor is periodically varied" denotes that the hydrogen concentration in said at least one said reactor is a function of time which is not constant.

The hydrogen concentration in the reactor is normally determined via on-line gas chromatography.

Unless otherwise mentioned in the following the term "polymerization" is tantamount to "preparing an olefin homo- or copolymer in the presence of an olefin polymerization catalyst"

For the purpose of the present invention the term "ppm" for the hydrogen concentration denotes parts per weight of hydrogen per one million parts per weight of the combined amount of hydrogen, monomers and diluent, if present, in the reactor.

Preferably, the hydrogen concentration in said reactor is varied within a range defined by a lower limit and an upper limit whereby the lower limit of the hydrogen concentration in said at least one reactor is varied within is preferably at least 10 ppm, more preferably at least 30 ppm and most preferably at least 60 ppm and wherein the upper limit of the range the hydrogen concentration in said at least one reactor is varied within is preferably not more than 20,000 ppm, more preferably not more than 17,500 ppm, even more preferably not more than 15,000 ppm and most preferably not more than 12,500 ppm.

Preferably, the difference: [upper limit minus lower limit] is at least 3,500 ppm, more preferably at least 5,000 ppm and most preferably at least 6,500 and most preferably at least 8,000 ppm.

The difference: [upper limit minus lower limit] is preferably not more than 19,000 ppm, more preferably not more than 16,000 ppm and most preferably not more than 13,000 ppm.

This shall be explained by means of the following non-limiting example wherein
  the hydrogen concentration is varied between 80 ppm and 10,000 ppm;
  thus, the difference [upper limit minus lower limit] is 9,920 ppm.

The periodical variation of the hydrogen concentration in said at least one reactor preferably starts with an increase of the hydrogen concentration in said reactor.

Preferably, one variation period comprises, more preferably consists of, two time segments $S_{inc}$ and $S_{dec}$
wherein
  the time segment $S_{inc}$ is defined by
    a starting time $t_{inc}(0)$;
    a hydrogen concentration in said reactor at the starting time $t_{inc}(0)$ defined as $c_{inc}(0)$;
    an end time $t_{inc}(\text{final})$;
    the length of time segment $S_{inc}$ is defined as $l(S_{inc}) = t_{inc}(\text{final}) - t_{inc}(0)$ a hydrogen concentration in said reactor at the end time $t_{inc}(\text{final})$ defined as $c_{inc}(\text{final})$; and
    the hydrogen concentration in said reactor at the starting time $t_{inc}(0)$ of said time segment $S_{inc}$ ($c_{inc}(0)$) is lower compared with the end time $t_{inc}(\text{final})$ of said time segment $S_{inc}$ ($c_{inc}(\text{final})$);
and wherein
the time segment $S_{dec}$ is defined by
  a starting time $t_{dec}(0)$;

a hydrogen concentration in said at least one reactor at the starting time $t_{dec}(0)$ defined as $c_{dec}(0)$, an end time $t_{dec}(\text{final})$;

the length of time segment $S_{dec}$ is defined as $$l(S_{dec}) = t_{dec}(\text{final}) - t_{dec}(0)$$

a hydrogen concentration in said at least one reactor at the end time $t_{dec}(\text{final})$ defined as $c_{dec}(\text{final})$; and the hydrogen concentration in said at least one reactor at the starting time $t_{dec}(0)$ of said time segment $S_{dec}$ ($c_{dec}(0)$) is higher compared with the end time $t_{dec}(\text{final})$ of said time segment $S_{dec}$ ($c_{dec}(\text{final})$).

Thus, the hydrogen concentration at the start of $S_{inc}$ is lower than at the end of $S_{inc}$ and the hydrogen concentration at the start of $S_{dec}$ is higher than at the end of $S_{dec}$.

The increase of the hydrogen concentration in said at least one reactor during time segment $S_{inc}$ is preferably carried out according to the following equation (I)

$$c(t) = c_{inc}(0) + f_1(t) \cdot \text{ppm/s} \quad (I)$$

wherein c(t) is the hydrogen concentration in said at least one reactor at the time t $c_{inc}(0)$ is the hydrogen concentration in said at least one reactor at the starting time $t_{inc}(0)$ of time segment $S_{inc}$ $f_1(t)$ is a monotonically increasing function or a strictly monotonic increasing function; and $$f_1(t_{inc}(0)) = 0 \text{ s.}$$

Preferably, $f_1(t)$ is a strictly monotonic increasing function and more preferably $f_1(t)$ is a linear increasing function.

Non-limiting examples for $S_{inc}$ are given in FIG. 1 $a$) to $c$), whereby in FIG. 1$a$) $f_1(t)$ is a monotonically increasing function;

in FIG. 1$b$) $f_1(t)$ is a strictly monotonic increasing function; and in FIG. 1$c$) $f_1(t)$ is a linear increasing function The decrease of the hydrogen concentration in said at least one reactor during time segment $S_{dec}$ is preferably carried out according to the following equation (II)

$$c(t) = c_{dec}(0) + f_2(t) \cdot \text{ppm/s} \quad (II)$$

wherein c(t) is the hydrogen concentration in said at least one reactor at the time t $C_{dec}(0)$ is the hydrogen concentration in said at least one reactor at the starting time $t_{dec}(0)$ of time segment $S_{dec}$ $f_2(t)$ is a monotonically decreasing function or a strictly monotonic decreasing function; and $$f_2(t_{dec}(0)) = 0 \text{ s.}$$

Preferably, $f_2(t)$ is a strictly monotonic decreasing function and more preferably a linear decreasing function.

Non-limiting examples for $S_{inc}$ are given in FIG. 1 $d$) to $e$), whereby in FIG. 1$d$) $f_2(t)$ is a monotonically decreasing function;

in FIG. 1$e$) $f_2(t)$ is a strictly monotonic decreasing function; and in FIG. 1$f$) $f_2(t)$ is a linear decreasing function.

A variation period may further comprise a time segment $S_{const}$ between time segment $S_{inc}$ and time segment $S_{dec}$ wherein the polymerization of the olefin homo- or copolymer is carried out at a constant hydrogen concentration $c_{const}$ in the reactor whereby in case time segment $S_{inc}$ precedes time segment $S_{dec}$ preferably $c_{const} = c_{inc}(\text{final})$;

in case time segment $S_{dec}$ precedes time segment $S_{inc}$ preferably $c_{const} = c_{dec}(\text{final})$;

and preferably, the length of time segment $S_{const}$ ($l(S_{const})$), if present is less than 10.0 hours, more preferably less than 5.0 hours, even more preferably less than 1.0 hour and most preferably less than 0.5 hours.

Figure 2A:
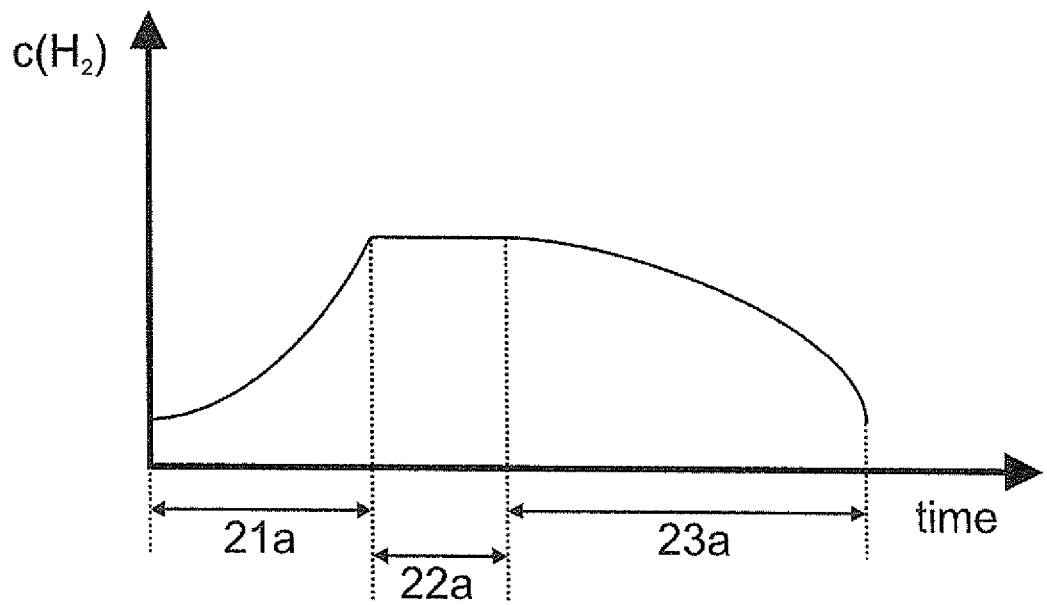
Figure 2B:
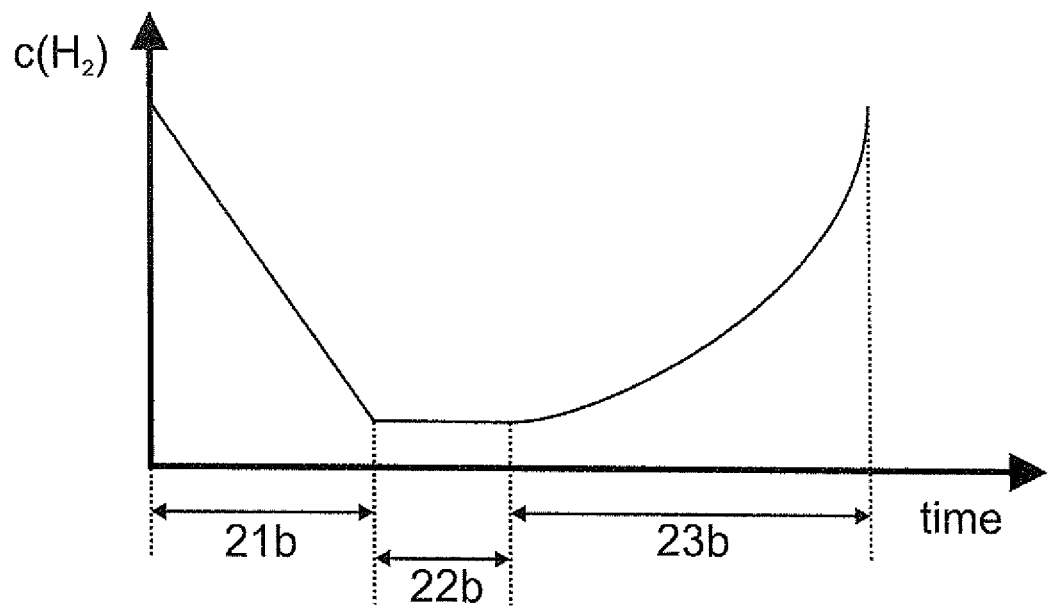

Non-limiting examples for a variation period comprising time segment $S_{const}$ between time segment $S_{inc}$ and time segment $S_{dec}$ are given in FIG. 2 $a$) and $b$) wherein in FIG. 2$a$) 21$a$ corresponds to $S_{inc}$, 22$a$ corresponds to $S_{const}$ and 23$a$ corresponds to $S_{dec}$, and in FIG. 2$b$) 21$b$ corresponds to $S_{dec}$, 22$b$ corresponds to $S_{const}$ and 23$b$ corresponds to $S_{inc}$.

Preferably one variation period consists of time segments $S_{inc}$, $S_{dec}$ and $S_{const}$ and more preferably one variation period consists of time segments $S_{inc}$ and $S_{dec}$.

In case $S_{inc}$ precedes $S_{dec}$ preferably $c_{inc}(\text{final}) = c_{dec}(0)$ and/or $c_{inc}(0) = c_{dec}(\text{final})$, more preferably $c_{inc}(\text{final}) = c_{dec}(0)$ and $c_{inc}(0) = c_{dec}(\text{final})$.

In case $S_{dec}$ precedes $S_{inc}$ preferably $c_{dec}(\text{final}) = c_{inc}(0)$ and/or $c_{dec}(0) = c_{inc}(\text{final})$, more preferably $c_{dec}(\text{final}) = c_{inc}(0)$ and $c_{dec}(0) = c_{inc}(\text{final})$.

In each variation period $S_{inc}$ preferably precedes $S_{dec}$. Thus, preferably the periodically variation starts with an increase of the hydrogen concentration in said at least one reactor.

In case each variation period consist of time segments $S_{inc}$, $S_{dec}$ and $S_{const}$, the time of one variation period (P) is defined as $$P = l(S_{inc}) + l(S_{dec}) + l(S_{const})$$

In case each variation period consist of time segments $S_{inc}$ and $S_{dec}$ the time of one variation period (P) is defined as $$P = l(S_{inc}) + l(S_{dec})$$

The variation of the hydrogen concentration in the reactor is preferably carried out by varying the hydrogen concentration of the hydrogen/monomer feed.

When the hydrogen concentration of the hydrogen/monomer feed is increased or decreased the hydrogen concentration in the reactor is also increased or decreased respectively. However, the variation of the hydrogen concentration of the hydrogen/monomer feed is not equivalent to the hydrogen concentration in the reactor as the chemical system will normally require some time to respond to the chemical input.

The decrease of the hydrogen concentration in said at least one reactor in each variation period is usually achieved by reducing the hydrogen concentration of the hydrogen/monomer feed.

The reduction of the hydrogen concentration of the hydrogen/monomer feed may be carried out by a monotonically decreasing or a strictly monotonic decreasing function.

Alternatively and preferably, the hydrogen concentration of the hydrogen/monomer feed is abruptly reduced, more preferably is abruptly reduced to the lower limit of the hydrogen concentration in said reactor is varied within.

Preferably, in case, one variation period comprises, more preferably consists of, two time segments $S_{inc}$ and $S_{dec}$, the hydrogen concentration of the hydrogen/monomer feed is reduced within time segment $S_{dec}$ to $c_{dec}(\text{final})$, more preferably is abruptly reduced to $c_{dec}(\text{final})$ within time segment $S_{dec}$ and most preferably is abruptly reduced to $c_{dec}(\text{final})$ at $t_{dec}(0)$.

An abrupt reduction of the hydrogen concentration of the hydrogen/monomer feed leads to a decrease of the hydrogen concentration in the reactor owing to the consumption of the hydrogen present in the reactor.

Preferably, step (c) is preceded by the following step
(b) feeding one or more (co)monomers and hydrogen to the reactor, whereby the hydrogen concentration in the reactor is remained constant.

A non-limiting example of a process comprising step (b) is shown in FIG. 3 wherein 31 corresponds to step (b) and 32 and 32a are each one variation period.

Preferably, in step (b), if present, the same comonomer(s) as in step (c) are fed to said at least one reactor.

In step (b) if present the hydrogen concentration in said at least one reactor is preferably either equal to $c_{inc}(0)$ in case step (d) starts with time segment $S_{inc}$ or equal to $c_{dec}(0)$ in case step (d) starts with time segment $S_{dec}$.

Preferably, step (b), if present, or step (c), if step (b) is not present is preceded by the following step
(a) prepolymerising the olefin polymerization catalyst with one or more comonomer(s)

Preferably, the process is a process for the production of $C_2$- to $C_8$-olefin homo- or copolymers, more preferably for the production of a propylene homo- or copolymer, even more preferably, for the production of a propylene homopolymer or a propylene block copolymer comprising a propylene homopolymer and a propylene/alpha-olefin rubber. In the latter case, the comonomers used for the production of the propylene/alpha-olefin rubber are preferably selected from ethylene and/or $C_4$- to $C_{20}$-alpha-olefins, even more are preferably selected from ethylene and/or $C_4$- to $C_{15}$-alpha-olefins, even more are preferably selected from ethylene and/or $C_4$- to $C_{10}$-alpha-olefins, e.g. ethylene, 1-butene, 1-hexene, 1-octene, and most preferably the alpha-olefin is ethylene.

For technical and economical reasons usually not more than five different comonomers are fed to the reactor during the process.

Preferably, process steps (c), (d) and (b), if present, are carried out at a temperature of at least 40° C., more preferably of at least 50° C.

Further, preferably, process steps (c), (d) and (b), if present, are carried out at a temperature of not more than 110° C., more preferably of not more than 90° C. and most preferably of not more than 80° C.

Preferably, the time of one variation period (P) is at least 4.0 h, more preferably is at least 6.0 h, even more preferably is at least 8.0 h and most preferably is at least 10.0 h.

Further, preferably, the time of one variation period (P) is not more than 50 h, more preferably is not more than 40 h, even more preferably is not more than 30 h, even more preferably is not more than 25 h and most preferably is not more than 20 h.

Preferably, the average residence time ($\tau$) [(tau)] is at least 0.25 hours, more preferably is at least 0.50 hours, even more preferably is at least 0.75 hours even more preferably is at least 1.0 hour and most preferably is at least 1.25 hours.

Further, preferably, the average residence time ($\tau$) [(tau)] is not more than 3.0 hours, more preferably is not more than 2.5 hours, even more preferably is not more than 2.0 hours and most preferably is not more than 1.75 hours.

Preferably, the ratio $P/\tau$ [P/tau] is at least 3.0, even more preferably is at least 4.0, even more preferably is at least 5.0, even more preferably is at least 6.0 and most preferably at least 7.0.

Preferably, the ratio $P/\tau$ [P/tau] is not more than 50, more preferably is not more than 35, even more preferably is not more than 25, even more preferably is not more than 20, and most preferably is not more than 18.

In case each variation period consist of time segments $S_{inc}$, $S_{dec}$ and $S_{const}$, the time of one variation period (P) is defined as $$P=l(S_{inc})+l(S_{dec})+l(S_{const})$$

In case each variation period consist of time segments $S_{inc}$ and $S_{dec}$ the time of one variation period (P) is defined as $$P=l(S_{inc})+l(S_{dec})$$

Preferably, l(Sine) is at least 2.0 hours, more preferably is at 15 least 3.0 hours, more preferably is at least 4.0 hours and most preferably is at least 5.0 hours.

Further, preferably, $l(S_{inc})$ is not more than 20 hours, more preferably is not more than 15 hours, more preferably is not more than 12.5 hours and most preferably is not more than 10 hours.

Preferably, $l(S_{dec})$ is at least is at least 2.0 hours, more preferably is at least 3.0 hours, more preferably is at least 4.0 hours and most preferably is at least 5.0 hours.

Further, preferably, $l(S_{dec})$ is not more than 20 hours, more preferably is not more than 15 hours, more preferably is not more than 12.5 hours and most preferably is not more than 10 hours.

Preferably, step (b), if present, is carried out for not more than 5 hours, more preferably not more than 4 hours, even more preferably for not more than 3 hours and most preferably for not more than 2.5 hours.

Preferably, process steps (c), (d) and (b), if present, are carried out at a pressure of at least 10 bar, more preferably of at least 20 bar and most preferably of at least 30 bar;

Further, preferably, process steps (c), (d) and (b), if present, are carried out at a pressure of not more than 100 bar, more preferably of not more than 80 bar and most preferably of not more than 50 bar;

Preferably, in step (a), if present, the average residence time of the polymer as calculated from flow rate and volume as described for t [tau] above is at least 2.0 min, more preferably at least 4.0 min and most preferably at least 6.0 min.

In step (a), if present, the average residence time of the polymer as calculated from flow rate and volume as described for r [tau] above preferably is not more than 15.0 min, more preferably is not more than 12.0 min and most preferably is not more than 9.0 min.

Preferably, step (a), if present, is carried out at temperature of at least 5° C., more preferably of at least 10° C. and most preferably of at least 15° C.

Step (a), if present, is preferably carried out at temperature of not more than 50° C., more preferably of not more than 35° C. and most preferably of not more than 25° C.

In case the process is carried out in more than one reactor, the process steps (c), (d), (e) and (b), if present, may be carried out in each of said reactors. Usually, for a cost-efficiency, the process is carried out in not more than three reactors, more preferably not more than two reactors and most preferably the variation is carried out in one reactor only.

Usually, in the process not more than five reactors are used, more preferably not more than three reactors and most preferably not more than two reactors are used.

The withdrawal of the polymer from said at least one reactor may be carried out continuously and/or batchwise, preferably continuously.

Preferably in the processes according to the invention the produced polymers are continuously withdrawn from said reactor during step (d).

Preferably, in the processes according to the invention the polyolefin is subjected to not more than one variation period in said at least one reactor.

Preferably, the polymer withdrawn in each variation period is routed to a different vessel compared with the previous variation period. Said vessel is preferably a powder silo, in which the polymer powder is collected and stored under a non-oxidizing atmosphere, preferably under nitrogen.

Preferably the polymer obtained from each full variation period is homogenized.

The homogenization of the withdrawn polymer may be carried out in a homogenization unit preferably the polymer from two or more powder silos is blended. Most preferably the blending is carried out in the pelletising unit.

The olefin polymerization catalyst in step d) is preferably a Ziegler-Natta catalyst as described above.

The invention is furthermore directed to a process for the production of a polypropylene composition comprising
  a propylene homo- or copolymer (A) with a polydispersity index (PI), determined according ISO 6721-1, of at least 5.8 $Pa^{-1}$; and
  an inorganic filler (B) in an amount from 2.0 to 20 parts per weight based on 100 parts per weight of (A)+(B).

The invention is also directed to a process for the production of a polypropylene composition comprising
  a propylene homo- or copolymer (A); and
  an inorganic filler (B);
  whereby the following relation is fulfilled
    $(80F+1700)MPa \leq T$
  wherein
    F are the parts per weight of component (B) based on 100 parts per weight of (A)+(B);
    T is the tensile modulus determined according to ISO 527-2 of a specimen consisting of the polypropylene composition and prepared by injection molding according to ISO 1873-2 in MPa.

The polypropylene composition according to the invention may be prepared by mixing together the components by any suitable method known in the art like twin screw extruders, Banbury mixers, 2- or 4-roll rubber mills or Buss co-kneaders. Preferably, the mixing will be performed in a twin screw extruder with one or more high intensity mixing segments and preferably at a temperature of 170 to 270° C., more preferably of 180 to 250° C.

The invention is furthermore directed to an article made of the inventive polypropylene composition. Preferably, said article is selected from pipes, car components, appliance housings and/or transport containers.

The invention is furthermore directed to the use of the inventive polypropylene composition for the production of pipes, car components, appliance housings, transport containers.

FIG. 1 a) to FIG. 1 c) show non-limiting examples for $S_{inc}$.

FIG. 1 d) to FIG. 1 f) show non-limiting examples for $S_{dec}$.

FIGS. 2a) and 2b) show non-limiting examples for a variation period comprising time segment $S_{const}$ between time segment $S_{inc}$ and time segment $S_{dec}$.

FIG. 3) shows a non-limiting example of a process comprising optional step b) before the variation is carried out.

Figure 4:
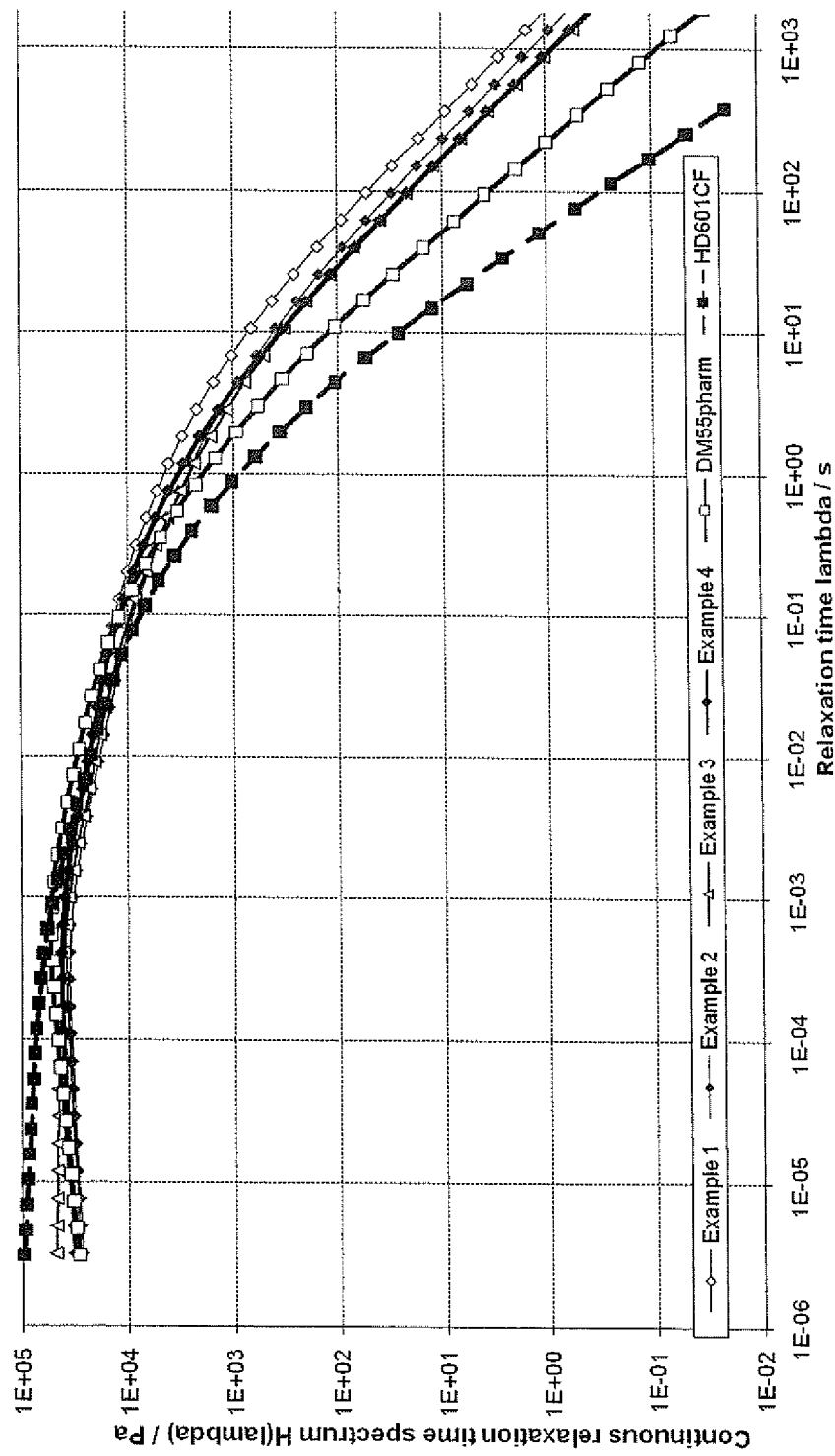

FIG. 4: shows the terminal relaxation time $\lambda_T$ [lambda$_T$] of the propylene homo- or copolymer (A) used in the examples calculated at a relaxation strength $H(\lambda)$ [H(lambda)] of 0.1 Pa.

In the following the present invention is further illustrated by means of non-limiting examples.

EXAMPLES

Definition of Test Methods

The test specimen for the measurement of the tensile modulus, charpy notch impact strength, tensile properties, heat deflection temperature and shrinkage of the propylene homo- or copolymer (A) is consisting of 99.85 wt. % of the propylene homo- or copolymer and as usual additives 0.05 wt. % Tris(2,4-di-tert-butylphenyl)phosphite, 0.05 wt. % Pentaerythritol Tetrakis(3-(3,5-di-tert-butyl-4-hydroxyphenyl)propionate (Irganox 8225 distributed by Ciba Specialty chemicals) and 0.05 wt. % Ca-Stearate ("SP" distributed by Faci).

Additives, like the above-mentioned, are routinely employed to stabilize polypropylenes. Without such additives the polypropylene would deteriorate during further processing. E.g. when preparing test specimen the polypropylene would deteriorate, leading to incorrect results.

a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

b) Charpy Notched Impact Test

Charpy impact strength was determined according to ISO 179-1eA:2000 on V-notched samples of 80×10×4 $mm^3$ at +23° C. The test specimens were prepared by injection moulding in line with ISO 1873-2.

c) Tensile Test

Tensile tests are performed according to ISO 527-2 at +23° C. on injection molded specimen (type 1B, 4 mm thickness) prepared by injection moulding in line with ISO 1873-2.

The tensile modulus (E-modulus) was calculated from the linear part of said tensile test results, conducting that part of the measurement with an elongation rate of 5 mm/min.

For determining tensile stress at yield (in MPa), tensile strain at yield (in %), tensile strength (in MPa), tensile strain at tensile strength (in %), tensile stress at break (in MPa) and tensile strain at break (in %) the aforementioned tensile test according to ISO 527-2 at +23° C. was continued with an elongation rate of 50 mm/min until the specimen broke.

d) Density

Density of the polymer was measured according to ISO 1183/D on compression moulded specimens.

e) NMR-Spectroscopy Measurements:

The $^{13}$C-NMR spectra of polypropylenes were recorded on Bruker 400

MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994). The NMR-measurement was used for determining the mmmm pentad concentration in a manner well known in the art.

f) Complex Viscosity and Zero Shear Viscosity

Dynamic rheological measurements were carried out with an Anton Paar MCR501 rheometer on compression molded samples under nitrogen atmosphere at 230° C. using 25 mm diameter plate and plate geometry. A range of frequency (ω) [(omega)] from 10-2 to $5 \cdot 10^2$ was covered in the measurement. The complex viscosity, η*(ω) [eta*(omega)], was calculated from the storage and loss moduli G',G"(ω) [G', G"(omega)] as $$\eta^*(\omega) = (G'(\omega)^2 + G''(\omega)^2)^{1/2}/\omega$$

[eta*(omega)=(G'(omega)$^2$+G"(omega)$^2$)$^{1/2}$/omega]

For calculating the zero shear viscosity, validity of the Cox/Merz relation $$f(\gamma')=\eta^*(\omega) \text{ for } \gamma'=\omega$$

[eta(gamma')=eta*(omega) for gamma=omega]

with γ' [gamma'] being the shear rate was assumed. The zero shear viscosity, $\eta_0$ [eta$_0$], was then determined from the lower limit of the viscosity curve η(γ') [eta(gamma')].

g) Weight Average Molecular Weight

The weight average molecular weight ($M_w$) was calculated from the zero shear viscosity ($\eta_0$) [eta$_0$] as resulting from a Cox-Merz conversion of the complex viscosity, and with the help of a calibration curve established in Grein et al. *Rheol. Acta* 46 (2007) 1083-1089.

h) Polydispersity Index (PI):

Dynamic rheological measurements were carried out with an Anton Paar MCR501 rheometer on compression molded samples under nitrogen atmosphere at 230° C. using 25 mm diameter plate and plate geometry. The oscillatory shear experiments were done within the linear viscoelastic range of strain at frequencies from 0.01 to 500 rad/s in line with ISO 6721-1.

The values of storage modulus (G'), loss modulus (G"), complex modulus (G*) and complex viscosity (η*) [(eta*)] were obtained as a function of frequency (ω) [(omega)]. The polydispersity index, $$PI=10^5/G_c,$$

is calculated from cross-over point of G'(ω) [G'(omega)] and G"(ω) [G"(omega)] at 230° C., for which $$G'(\omega_c)=G''(\omega_c)=G_c \text{ [G'(omega}_c)=G''(\text{omega}_c)=G_c]$$

holds.

j) Weight Average Molecular Weight and Molecular Weight Distribution by GPC Measurements (Polymers 5, 6 and 7 Only)

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlo-robenzene (TCB, stabilized with 200 mg/l 2,6-di-tert-butyl-4-methyl-phenol) as solvent at 145° C. and at a constant flow rate of 1 ml/min. 216.5 microliter of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 ml (at 160° C.) of stabilized TCB (same as mobile phase) and keeping for 3 hours with continuous shaking prior sampling in into the GPC instrument.

k) Terminal Relaxation Time $\lambda_T$ [lambda$_T$]

To further determine the content of high molecular weight components decisive for crystallization and stiffness of the polymers and compositions based on the same, a terminal relaxation time ($\lambda_T$) [(lambda$_T$)] was calculated. For this, a continuous relaxation time spectrum H(λ) [H(lambda)] was calculated from the storage and loss modulus data (G',G"(ω)) [(G',G"(omega))] using the Rheoplus 123 Software V 2.66 of Anton Paar KG. The underlying calculation principles are for example described in T. Mezger, *The Rheology Handbook*, Vincentz Network 2006, pages 109-113. A bandwidth of 1% was set and 50 values of relaxation time λ [lambda] predetermined, using an automatic limit selection. The regularization parameter a was set at 0.01 and a cubic spline was used for smoothing. For characterizing the longest molecules present, a terminal relaxation time $\lambda_T$ [lambda$_T$] was calculated at a relaxation strength H(λ) [H(lambda)] of 0.1 Pa.

l) Heat Deflection Temperature (HDT):

The HDT was determined on injection molded test specimens of 80×10×4 mm$^3$ prepared according to ISO 1873-2 and stored at +23° C. for at least 96 hours prior to measurement. The test was performed on flatwise supported specimens according to ISO 75, condition A, with a nominal surface stress of 1.80 MPa.

m) Differential Scanning Calorimetry (DSC):

DSC is run according to ISO 3146/part 3/method C2 in a heat/cool/heat cycle with a scan rate of 10° C./min in the temperature range of +23 to +210° C. Crystallization temperature and enthalpy are determined from the cooling step, while melting temperature and melting enthalpy are determined from the second heating step.

n) NMR-Spectroscopy Measurements:

The $^{13}$C-NMR spectra of polypropylenes were recorded on Bruker 400 MHz spectrometer at 130° C. from samples dissolved in 1,2,4-trichloro-benzene/benzene-d$_6$ (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994). The NMR-measurement was used for determining the mmmm pentad concentration in a manner well known in the art.

o) Ethylene Content:

The relative amount of $C_2$ in the polymer (only for polymer 4) was measured with Fourier transform infrared spectroscopy (FTIR). When measuring the ethylene content in polypropylene, a thin film of the sample (thickness about 250 mm) was prepared by hot-pressing. The area of —CH$_2$— absorption peak (800-650 cm$^{-1}$) was measured with Perkin Elmer FTIR 1600 spectrometer. The method was calibrated by ethylene content data measured by $^{13}$C-NMR.

p) Shrinkage:

The shrinkage was measured on injection molded rectangular plates of 150×80×2 mm$^3$ filled with a triangular distributor and a 0.5 mm thick film gate along the shorter side. A melt temperature of 260° C., a mold temperature of 60° C. and an injection speed at the gate of 100 mm/s were used for producing the specimens which were cut free from the distributor immediately after demolding. The specimens were then stored at +23° C. for 14 days and the relative shrinkage against the mold dimension was determined in both longitudinal (flow) and transversal direction, measuring in the center of the specimen in each case. 10 specimens were tested for determining average values, and the difference was calculated from the averages.

q) Particle Size (Filler Before Compounding)

The particle sizes d50 and d95 are calculated from the particle size distribution measured by laser diffraction according to ISO 13320-1:1999.

r) Specific Surface of Filler

The specific surface of the talc is determined according to DIN 66131/2.

s) Average Aspect Ratio of Filler

The average aspect ratio has been determined by recording transmission electron microscopy (TEM) images of the pure inorganic filler prepared onto film-coated TEM grids from an aqueous suspension by rotating the sample in 1° intervals from −75° to +75°, e.g. with JEOL JEM-2100 microscope, and reconstructing the three dimensional structure (e.g. with the JEOL TEMography™ software). 100 particles were measured and the average calculated. The aspect ratio of a particle is the ratio of the longest and shortest particle radii that pass through the geometric centre of the particle.

In case of anisotropy in one dimension (fiber-like) or two dimensions (platelet-like) structures the geometric center equals the center of gravity of the particle.

Compositions

In the following examples the hydrogen concentration in the reactor has been determined via on-line gas chromatography.

Production of Propylene Polymers

Example 1

The experimental polypropylene homopolymer has been produced in a Borstar PP pilot plant as follows:

The catalyst has been prepared as defined in EP 0 491 566 A2; EP 0 591 224 B1 or EP 0 586 390 B1.

(Ti=1.9 wt.-%), dicyclopentyl dimethoxy silane (DCP-DMS) was used as donor and triethyl-aluminium (TEA) as cocatalyst with a TEA/$C_3$ ratio [g/kg] of 0.20 and a TEA/donor ratio [wt %/wt %] of 5. The catalyst was fed in paste form at a concentration of 100 g/l in a mixture of 70 vol % paraffin oil and 30 vol % vaseline fat, prepolymerized in liquid propylene at 20° C. in a stirred prepolymerization reactor having an average residence time of 7 minutes. The actual polymerization was carried out in a single loop reactor at a temperature of 62° C. and a pressure of 3400 kPa, starting by feeding propylene at a rate of 70 kg/h with 80 ppm of hydrogen ($c_0$), corresponding to an $MFR_2$ of 0.1 g/10 min, for which a loop density of 520 kg/m$^3$ was adjusted (corresponding to an average residence time t [tau] of 1.5 h) before starting the variation period. At $t_0$=0 the polymer collection was started. Beginning 2 hours after $t_0$ the hydrogen concentration in the reactor was increased linearly over time by adjusting the hydrogen concentration of the hydrogen/monomer feed in such a way that a maximum concentration ($c_{max}$) of 10000 ppm (corresponding to an $MFR_2$ of 80 g/min) was reached in the reactor 9 hours after $t_0$, and the hydrogen concentration of the hydrogen/monomer feed was reduced back to 80 ppm ($T_f$=7 h). The polymerization was continued and within a time of 9 h the original hydrogen concentration of 80 ppm in the reactor could be reached ($T_R$=9 h), meaning that the time of one variation period P was 16 h and the ratio between P and τ [tau] was 10.67.

Following deactivation of the catalyst with steam and drying of the resulting polymer powder with warm nitrogen, the resulting 500 kg of polymer were transferred to a powder mixing silo and homogenized, then the resulting polypropylene homopolymer was compounded together with 0.07 wt. % Calcium Stearate (SP distributed by Faci) and 0.60 wt. % Irganox B225 (antioxidant combination supplied by Ciba Specialty Chemicals) in a twin screw extruder at 270 to 300° C. An $MFR_2$ value of 1.2 g/10 min, a PI value of 7.3 Pa$^{-1}$ and a weight average molecular weight ($M_w$) of 679 kg/mol were determined for this polymer.

Example 2

The process was carried out as in example 1, except that the increase of the hydrogen concentration in the reactor was started immediately at $t_0$=0 ($T_f$=9 h) but all other parameters were kept constant. This means that the time of one variation period P was 18 h and the ratio between P and τ [tau] was 12. An $MFR_2$ value of 2.3 g/10 min, a PI value of 8.6 Pa$^{-1}$ and a weight average molecular weight ($M_w$) of 607 kg/mol were determined for this polymer.

Example 3

The process was carried out as in example 1, except that the increase of the hydrogen concentration in the reactor was started immediately at $t_0$=0 and setting the maximum hydrogen concentration $c_{max}$ to 8000 ppm to be reached after 6 hours ($T_f$=6 h) while keeping all other parameters constant; the initial hydrogen concentration in the reactor ($c_0$) could be reached after 6 hours here ($T_f$=6 h). This means that the time of one variation period P was 12 h and the ratio between P and τ [tau] was 8. An $MFR_2$ value of 2.3 g/10 min, a PI value of 7.0 Pa$^{-1}$ and a weight average molecular weight ($M_w$) of 586 kg/mol were determined for this polymer.

Example 4

The experimental polypropylene copolymer has been produced in a Borstar PP pilot plant as follows:

The catalyst has been prepared as defined in EP 0 491 566 A2; EP 0 591 224 B1 or EP 0 586 390 B1

(Ti=1.9 wt.-%), dicyclopentyl dimethoxy silane (DCP-DMS) was used as donor and triethyl-aluminium (TEA) as cocatalyst with a TEA/$C_3$ ratio [g/kg] of 0.20 and a TEA/donor ratio [wt %/wt %] of 5.

The catalyst was fed in paste form at a concentration of 100 g/l in a mixture of 70 vol % paraffin oil and 30 vol % vaseline fat, prepolymerized in liquid propylene at 20° C. in a stirred prepolymerization reactor having an average residence time of 7 minutes. The first step of the polymerization was carried out in a single loop reactor at a temperature of 62° C. and a pressure of 3400 kPa, starting by feeding propylene with 80 ppm of hydrogen ($c_0$), for which a loop density of 520 kg/m$^3$ was adjusted before starting the variation period. At a certain time $t_0$=0 the polymer collection was started and the hydrogen concentration of the hydrogen/monomer feed was increased linearly over time in such a way that a final hydrogen concentration in the reactor of 8000 ppm (corresponding to an $MFR_2$ of 80 g/min) was reached 1.5 hours after $t_0$, at which time the polymer was transferred to a gas phase reactor and the hydrogen feed was maintained constant (for calculation purposes, $T_f$=1.5 h and $T_R$=6 h are assumed, meaning that the time of one variation period P was 7.5 h and the ratio between P and τ [tau] was 5). The second step of the polymerization was carried out in a gas phase reactor with stirred bed and pure propylene feed (no additional hydrogen) at 60° C. and 1500 kPa without, the third step in a second gas phase reactor with stirred bed and pure ethylene feed with 80 ppm hydrogen at 60° C. and 1500 kPa.

Following deactivation of the catalyst with steam and drying of the resulting polymer powder with warm nitrogen, the resulting 500 kg of polymer were transferred to a powder mixing silo and homogenized, then the resulting polypropylene homopolymer was compounded together with 0.07 wt % Calcium Stearate (SP distributed by Faci) and 0.60% Irganox B225 (antioxidant combination supplied by Ciba Specialty Chemicals) in a twin screw extruder at 270 to 300° C. An $MFR_2$ value of 1.3 g/10 min, a PI value of 5.9 Pa$^{-1}$, a weight average molecular weight of 596 kg/mol and an ethylene content of 1.8 wt % were determined for this polymer Polymer 5 (HD601CF): This is a polypropylene homopolymer commercially available from Borealis, having an $MFR_2$ of 8 g/10 min, a density of 905 kg/m³ and a melting point of 165° C.

Polymer 6 (HF700SA): This is a polypropylene homopolymer commercially from Borealis, having an $MFR_2$ of 20 g/10 min, a density of 905 kg/m³ and a melting point of 164° C.

Polymer 7 (DM55 pharm): This is a polypropylene homopolymer commercially available from Borealis, having an $MFR_2$ of 2.8 g/10 min, a density of 905 kg/m³ and a melting point of 163° C.

Table 1 shows the properties of the propylene polymers 1 to 7.

sented in FIG. 4. For characterizing the longest molecules present, a terminal relaxation time $\lambda_T$ [lambda$_T$] was calculated at a relaxation strength H(λ) [H(lambda)] of 0.1 Pa. Said results are also given in table 1 below.

In a comparative test the propylene homo- and copolymers 1 to 4 have been alpha-nucleated by melt mixing with 0.2 wt % of Adekastab NA-11 UH (distributed by Adeka Palmarole). These alpha-nucleated polymers are denominated comparative compositions 1B, 2B, 3B and 4B in table 2. As shown in table 2 below, the tensile modulus increased but the impact

TABLE 1

|  |  | 1 | 2 | 3 | 4 | 5 | 6 | 7 |
|---|---|---|---|---|---|---|---|---|
| initial $H_2$-feed | [ppm] | 80 | 80 | 80 | 80 | n.a. | n.a. | n.a. |
| maximum $H_2$-feed | [ppm] | 10,000 | 10,000 | 8,000 | 8,000 | n.a. | n.a. | n.a. |
| average residence time τ | [h] | 1.5 | 1.5 | 1.5 | 1.5 | n.a. | n.a. | n.a. |
| increase period $T_I$ | [h] | 7 | 9 | 6 | 1.5 | n.a. | n.a. | n.a. |
| reduction period $T_R$ | [h] | 9 | 9 | 6 | 6 | n.a. | n.a. | n.a. |
| P | [h] | 16 | 18 | 12 | 7.5 | n.a. | n.a. | n.a. |
| P/τ [P/tau] | — | 10.67 | 12 | 8 | 5 | n.a. | n.a. | n.a. |
| $MFR_2$ (230° C., 2.16 kg) powder | g/10 min | 3.9 | 10.9 | 7.1 | 4.4 | 8.0 | n.d. | 2.8 |
| $MFR_2$ (230° C., 2.16 kg) pellet | [g/10 min] | 1.2 | 2.3 | 2.3 | 1.3 | 8.0 | 20 | 2.8 |
| Polydispersity index (PI) | [Pa$^{-1}$] | 7.3 | 8.6 | 7.0 | 5.9 | 3.5 | 2.8 | 3.3 |
| $M_w$ | [kg/mol] | 679 | 607 | 586 | 596 | 367 | 260 | 540 |
| tensile modulus | MPa | 1833 | 1852 | 1844 | 1837 | 1420 | 1500 | 1350 |
| tensile stress at yield | MPa | 38 | 38 | 38 | 38 | 32.0 | 34.0 | 29 |
| tensile strain at yield | % | 8 | 8 | 8 | 8 | n.d. | 8.0 | 9.0 |
| tensile strength | MPa | 38 | 38 | 38 | 38 | n.d. | n.d. | n.d. |
| tensile strain at tensile strength | % | 8 | 8 | 8 | 8 | n.d. | n.d. | n.d. |
| tensile stress at break | MPa | 15 | 17 | 17 | 15 | n.d. | n.d. | n.d. |
| tensile strain at break | % | 115 | 90 | 110 | 109 | n.d. | n.d. | n.d. |
| Charpy notched impact strength 23° C. | kJ/m² | 5 | 4 | 4 | 6 | 3.8 | 3.5 | 4.1 |
| $\lambda_T$ at H(λ) = 0.1 Pa [lambda$_T$ at H(lambda) = 0.1 Pa] | s | 10800 | 7220 | 4610 | 4730 | 165 | 95 | 950 | n.d. not determined; n.a. not applicable

The resulting continuous relaxation time spectra H(λ) [H(lambda)] of inventive and comparative polymers are presented in strength in a Charpy notched impact test according to ISO 179/1eA:2000 is decreased.

TABLE 2

| composition (not nucleated) |  | 1 | 2 | 3 | 4 | 5 | 6 | 7 |
|---|---|---|---|---|---|---|---|---|
| Powder $MFR_2$ (230° C., 2.16 kg) | g/10 min | 3.9 | 10.9 | 7.1 | 4.4 | 8.0 | n.a. | 2.8 |
| Pellet $MFR_2$ (230° C., 2.16 kg) | g/10 min | 1.2 | 2.3 | 2.3 | 1.3 | 8.0 | 20 | 2.8 |
| tensile modulus | MPa | 1833 | 1852 | 1844 | 1837 | 1420 | 1500 | 1350 |
| tensile stress at yield | MPa | 38 | 38 | 38 | 38 | 32 | 34.0 | 29 |
| tensile strain at yield | % | 8 | 8 | 8 | 8 | n.d. | n.d. | n.d. |
| tensile strength | MPa | 38 | 38 | 38 | 38 | n.d. | n.d. | n.d. |
| tensile strain at tensile strength | % | 8 | 8 | 8 | 8 | n.d. | n.d. | n.d. |
| tensile stress at break | MPa | 15 | 17 | 17 | 15 | n.d. | n.d. | n.d. |
| tensile strain at break | % | 115 | 90 | 110 | 109 | n.d. | n.d. | n.d. |
| charpy notched impact strength 23° C. | kJ/m² | 5 | 4 | 4 | 6 | 3.8 | 3.5 | 4.1 |
| Polydispersity index (PI) | [Pa$^{-1}$] | 7.3 | 8.6 | 7.0 | 5.9 | 3.5 | 2.8 | 3.3 |
| $M_w$ | [kg/mol] | 679 | 607 | 586 | 596 | 367 | 260 | 540 |

| comparative composition (alpha-nucleated) |  | 1B | 2B | 3B | 5B |
|---|---|---|---|---|---|
| tensile modulus | MPa | 2287 | 2277 | 2247 | 2271 |
| tensile stress at yield | MPa | 42 | 42 | 42 | 42 |
| tensile strain at yield | % | 6 | 6 | 6 | 6 |
| tensile strength | MPa | 42 | 42 | 42 | 42 |
| tensile strain at tensile strength | % | 6 | 6 | 6 | 6 |
| tensile stress at break | MPa | 12 | 24 | 19 | 15 |
| tensile strain at break | % | 79 | 24 | 45 | 154 |
| impact strength 23° C. | kJ/m² | 3 | 3 | 2 | 3 |
| Delta Tensile Modulus | MPa | 454 | 425 | 396 | 430 |
| Delta Impact | kJ/m² | −2 | −1 | −2 | −2 | n.d. not determined

The compounding of the compositions was performed in a twin screw extruder with two high intensity mixing segments and at a temperature of 190 to 230° C.

Comparative compositions 5C, 7C and inventive compositions 1C, 2C, 3C and 4C were prepared by compounding 94.2 wt. % of the respective polymer with 5 wt. % talc (Jetfine 3CA, distributed by Luzenac), 0.1 wt. % Ca-stearat (SP distributed by Faci), 0.2 wt. % Irganox B225 (distributed by Ciba) and 0.5 glycerol monostearate (GMS, distributed by Faci).

Comparative composition 5D, 7D and inventive compositions 1D, 2D, 3D and 4D were prepared by compounding 89.2 wt. % of the respective polymer with 10 wt. % talc (Jetfine 3CA, distributed by Luzenac), 0.1 wt. % Ca-stearat (SP distributed by Faci), 0.2 wt. % Irganox B225 (distributed by Ciba) and 0.5 glycerol monostearate (GMS, distributed by Faci).

Comparative composition 6E and inventive composition 3E was prepared by compounding 94.2 wt. % of polymer 3 with 5 wt. % talc (HAR T84, distributed by Luzenac), 0.1 wt. % Ca-stearat (SP distributed by Faci), 0.2 wt. % Irganox B225 (distributed by Ciba) and 0.5 glycerol monostearate (GMS, distributed by Faci).

Comparative composition 6F and inventive compositions 3F was prepared by compounding 89.2 wt. % of polymer 3 with 10 wt. % talc (HAR T84, distributed by Luzenac), 0.1 wt. % Ca-stearat (SP distributed by Faci), 0.2 wt. % Irganox B225 (distributed by Ciba) and 0.5 glycerol monostearate (GMS, distributed by Faci).

Irganox B225 is a blend of 50% Irgafos 168 and 50% Irganox 1010.

Jetfine 3CA, distributed by Luzenac, is talc having
- a screen residue (Alpine Airjet) of 0.03% of particles>15 µm
- a d50 value of 1.0 µm and a d95 value of 3.3 µm, both calculated from the particle size distribution measured by laser diffraction according to ISO 13320-1:1999.
- a specific surface area measured according to DIN 66131/2 of 14.5 m$^2$/g
- a specific gravity determined according to ISO 787/10 of 2.78 g/cm$^3$
- a hardness on the Mohs' scale of 1
- a moisture content determined according to ISO 787/2 of ≤0.3% an average aspect ratio of 9.5

HAR T84, distributed by Luzenac, is a talc having
- a d50 value of 2 µm and a d95 value of 10 µm, both calculated from the particle size distribution measured by laser diffraction according to ISO 13320-1:1999.
- a specific surface area measured according to DIN 66131/2 of 16 m$^2$/g
- a specific gravity determined according to ISO 787/10 of 2.78 g/cm$^3$
- a hardness on the Mohs' scale of 1
- a moisture content determined according to ISO 787/2 of ≤0.3%
- an average aspect ratio of 14.5

The results are shown in table 3A and 3B below.

TABLE 3A

| | | inventive compositions | | | | | | | |
|---|---|---|---|---|---|---|---|---|---|
| | | 1C | 1D | 2C | 2D | 3C | 3D | 3E | 3F |
| MFR$_2$ (230° C., 2.16 kg) | [g/10 min] | 1.2 | 1.28 | 2.97 | 3.12 | 2.76 | 2.67 | 2.69 | 2.92 |
| Crystallization | | | | | | | | | |
| Melting temperature | [° C.] | 166.1 | 167 | 165.8 | 166.7 | 167 | 166.4 | 165.9 | 166.6 |
| heat of fusion | [J/g] | 106.9 | 102.3 | 108 | 102.4 | 103.9 | 100.8 | 107.2 | 101.4 |
| crystallization temperature | [° C.] | 127.3 | 127.6 | 127.6 | 127.9 | 126.6 | 127.9 | 126.2 | 126.9 |
| heat of crystallization | [J/g] | 103.1 | 94.5 | 103.9 | 94.8 | 103.2 | 93.6 | 103.6 | 92.6 |
| Tensile test | | | | | | | | | |
| tensile modulus | [MPa] | 2404.1 | 2757.2 | 2440.4 | 2815 | 2367.5 | 2765.5 | 2428.8 | 2903.5 |
| tesnsile stress at yield | [MPa] | 40.1 | 40.2 | 40.1 | 40.3 | 39.8 | 39.9 | 39.3 | 40.1 |
| tensile strain at yield | [%] | 6 | 5.3 | 5.6 | 5 | 6 | 5.3 | 5.7 | 5 |
| tensile strength | [MPa] | 40.1 | 40.2 | 40.1 | 40.3 | 39.8 | 39.9 | 39.3 | 40.1 |
| tensile strain at tensile strength | [%] | 5.98 | 5.3 | 5.64 | 4.98 | 5.98 | 5.32 | 5.69 | 5.02 |
| tensile stress at break | [MPa] | 4.4 | 4.1 | 22 | 14.7 | 8.3 | 5.4 | 6.8 | 16.6 |
| tensile strain at break | [%] | 80.6 | 50.17 | 18.72 | 20.75 | 49.67 | 39.26 | 36.25 | 21.78 |
| Charpy impact test | | | | | | | | | |
| 23° C., V-notched, specimen | [kJ/m$^2$] | 7.5 | 6.1 | 4.3 | 4 | 5 | 4.2 | 5.4 | 4.4 |
| HDT | | | | | | | | | |
| Temperature | [° C.] | 59 | 61.6 | 59 | 62 | 58.4 | 61.4 | 58.4 | 62.6 |
| Shrinkage | | | | | | | | | |
| longitudinal | [%] | 1.989 | 1.84 | 1.664 | 1.571 | 1.701 | 1.602 | 1.699 | 1.528 |
| transversal | [%] | 1.272 | 1.228 | 1.192 | 1.154 | 1.176 | 1.165 | 1.199 | 1.135 |
| Δ(longitudinal-transversal) | [%] | 0.717 | 0.612 | 0.472 | 0.417 | 0.525 | 0.437 | 0.5 | 0.393 |

TABLE 3B

|  |  | inventive compositions | | comparative compositions | | | | | |
|---|---|---|---|---|---|---|---|---|---|
|  |  | 4C | 4D | 5C | 5D | 6E | 6F | 7C | 7D |
| MFR$_2$ (230° C., 2.16 kg) | [g/10 min] | 1.29 | 1.45 | 7.64 | 8.1 | 23.41 | 24.7 | 2.91 | 3.19 |
| Crystallization |  |  |  |  |  |  |  |  |  |
| Melting temperature | [° C.] | 166.5 | 167.1 | 165.2 | 165.4 | 164.5 | 165.1 | 164.7 | 164.8 |
| heat of fusion | [J/g] | 105.1 | 98.8 | 103.8 | 96.3 | 103.4 | 97.5 | 100.2 | 94.7 |
| crystallization temperature | [° C.] | 127 | 127.6 | 126.1 | 127.2 | 126.2 | 127.6 | 125.1 | 126.1 |
| heat of crystallization | [J/g] | 102.7 | 92.6 | 102.1 | 90.3 | 102.7 | 91.3 | 98.7 | 88.7 |
| Tensile test |  |  |  |  |  |  |  |  |  |
| tensile modulus | [MPa] | 2427.9 | 2771.5 | 2096.8 | 2493.9 | 2044.3 | 2353.5 | 2069.2 | 2405.5 |
| tensile stress at yield | [MPa] | 40 | 40.2 | 37.5 | 37.8 | 36.5 | 36.7 | 37.6 | 38 |
| tensile strain at yield | [%] | 6 | 5.3 | 6.6 | 5.7 | 7.2 | 6.1 | 6.9 | 6.1 |
| tensile strength | [MPa] | 40 | 40.2 | 37.5 | 37.8 | 36.5 | 36.7 | 37.6 | 38 |
| tensile strain at tensile strength | [%] | 5.97 | 5.32 | 6.57 | 5.74 | 7.17 | 6.1 | 6.9 | 6.08 |
| tensile stress at break | [MPa] | 4.2 | 4.3 | 8.2 | 6.1 | 9.7 | 18.8 | 5.7 | 2.1 |
| tensile strain at break | [%] | 85.61 | 44.9 | 56.54 | 39.28 | 50.1 | 23.56 | 93.44 | 91.01 |
| Charpy impact test |  |  |  |  |  |  |  |  |  |
| 23° C._V-notched specimen | [kJ/m$^2$] | 7.4 | 5.7 | 3.7 | 3.7 | 2.7 | 2.3 | 6.2 | 5.4 |
| HDT |  |  |  |  |  |  |  |  |  |
| Temperature | [° C.] | 58.9 | 63.5 | 55.6 | 58.7 | 55.4 | 57.3 | 54.4 | 60.9 |
| Shrinkage |  |  |  |  |  |  |  |  |  |
| longitudinal | [%] | 1.957 | 1.821 | 1.234 | 1.176 | 1.059 | 1.017 | 1.544 | 1.415 |
| transversal | [%] | 1.257 | 1.208 | 1.173 | 1.128 | 1.114 | 1.082 | 1.203 | 1.162 |
| Δ(longitudinal-transversal) | [%] | 0.7 | 0.613 | 0.061 | 0.048 | −0.055 | −0.065 | 0.341 | 0.253 |

The invention claimed is:

1. A process for the production of a polypropylene composition comprising a propylene homo- or copolymer (A) with a polydispersity index (PI), determined according ISO 6721-1, of at least 5.8 Pa$^{-1}$, in an amount of at least 80 wt %; and an inorganic filler (B);
    wherein the process comprises preparing the propylene homo- or copolymer (A) in one or more reactors wherein in at least one reactor the process comprises the following steps:
    a) feeding one or more (co)monomers and hydrogen to the reactor, whereby the hydrogen concentration in said reactor is periodically varied;
    b) preparing the propylene homo- or copolymer (A) in the presence of an olefin polymerization catalyst; and
    c) withdrawing the propylene homo- or copolymer (A) from said at least one reactor, whereby the following relation is fulfilled:
    P/Tau>2.0, wherein
        P is the time of one variation period of the hydrogen concentration in said at least on reactor; and
        Tau is the average residence time of the polymer in said at least one reactor.

2. The process according to claim 1, wherein the following relation is fulfilled by the polypropylene composition:

(80F+1700)MPa≤T wherein
F are the parts per weight of component (B) based on 100 parts per weight of the total amount of (A)+(B);
T is the tensile modulus in MPa, determined according to ISO 527-2, of the polypropylene composition measured on a test specimen prepared by injection molding according to ISO 1873-2.

3. The process according to claim 1, wherein component (B) of the polypropylene composition is selected from natural silicates or glass platelets or fibers.

4. The process according to claim 1, wherein the average aspect ratio of the filler of the polypropylene composition is at least 5.0.

5. The process according to claim 1, wherein the MFR$_2$ of the polypropylene composition, determined according to ISO 1133 at 230° C. and under a load of 2.16 kg, is from 0.01 to 100 g/10 min.

6. The process according to claim 1, wherein the polypropylene composition has a tensile modulus determined according to ISO 527-2 of at least 2000 MPa measured on a test specimen prepared by injection molding according to ISO 1873-2.

7. The process according to claim 1, wherein the polypropylene composition has an impact strength in a charpy notch test according to ISO 179/1eA:2000 at +23° C. of at least 3.8 kJ/m$^2$ measured on a V-notched test specimen prepared by injection molding according to ISO 1873-2.

8. The process according to claim 1, wherein the polypropylene composition has a longitudinal shrinkage of not more than 2.2%.

9. The process according to claim 1, wherein the polypropylene composition has a transversal shrinkage of not more than 2.0%.

10. The process according to claim 1, wherein the inorganic filler (B) of the polypropylene composition is present in an amount from 4.0 to 18.0 parts per weight, based on 100 parts per weight of (A)+(B).

* * * * *

UNITED STATES PATENT AND TRADEMARK OFFICE
CERTIFICATE OF CORRECTION

| | | |
|---|---|---|
| PATENT NO. | : 8,759,452 B2 | Page 1 of 1 |
| APPLICATION NO. | : 13/129511 | |
| DATED | : June 24, 2014 | |
| INVENTOR(S) | : Gahleitner et al. | |

It is certified that error appears in the above-identified patent and that said Letters Patent is hereby corrected as shown below:

IN THE CLAIMS:

Claim 1, at col. 25, line 51, the word "on" should read - one -.

Signed and Sealed this
Thirtieth Day of December, 2014

Michelle K. Lee
*Deputy Director of the United States Patent and Trademark Office*